United States Patent

Kuroda et al.

[11] Patent Number: 6,052,272
[45] Date of Patent: Apr. 18, 2000

[54] LAMINATED CAPACITOR

[75] Inventors: Yoichi Kuroda; Yukio Honda, both of Fukui, Japan; Kazumi Osuga, Taichung, Taiwan

[73] Assignee: Murata Manufacturing Co., Ltd., Japan

[21] Appl. No.: 09/039,088

[22] Filed: Mar. 13, 1998

[30] Foreign Application Priority Data

Mar. 19, 1997 [JP] Japan ............................ 9-086050

[51] Int. Cl.[7] ........................................ H01G 4/00
[52] U.S. Cl. ................. 361/303; 361/306.3; 361/311; 361/313; 361/321.1
[58] Field of Search ............... 361/301.1–301.4, 361/303, 304, 305, 306.1, 306.2, 306.3, 311–313, 320, 321.1–321.5

[56] References Cited

U.S. PATENT DOCUMENTS 4,513,350  4/1985  Coleman ........................... 361/321
5,157,576  10/1992  Takaya et al. ..................... 361/321
5,835,338  11/1998  Suzuki et al. ..................... 361/301.4

*Primary Examiner*—Kristine Kincaid
*Assistant Examiner*—Eric Thomas
*Attorney, Agent, or Firm*—Ostrolenk, Faber, Gerb & Soffen, LLP

[57] ABSTRACT

A laminated capacitor that can be made small in size, that can prevent flashover, has excellent dielectric strength performance and a large capacitance is disclosed. Each gap between internal electrodes in the same plane is set at 2.7 to 20 times a thickness (element thickness) of a dielectric layer positioned between first and second internal electrode groups which face each other and a distance between an edge of the external terminal and an edge of the floating internal electrode closest to the external terminal among floating internal electrodes of the internal electrode group of the outermost layer is set at 0.4 mm to 1.4 mm.

6 Claims, 4 Drawing Sheets

LAMINATED CAPACITOR

BACKGROUND OF THE INVENTION

1. Field of the Invention

The present invention relates to a laminated capacitor and more particularly to a small, high-withstanding and high-capacity laminated capacitor.

2. Description of Related Art

A laminated capacitor is shown in FIG. 3 known from the prior art. The capacitor has a structure in which external terminals 54a and 54b conduct with internal electrodes 52a and 52b, respectively in an alternating manner. The capacitor comprises a chip 53 in which a dielectric (layer) 51 and the internal electrodes 52a and 52b are laminated alternately as shown in FIG. 3. In another embodiment of the prior art capacitor, as shown in FIG. 4, a double series structure is used in which a floating internal electrode 62 which is not connected with the external terminals 54a or 54b is disposed. The floating electrode 62 is serially connected such that two dual capacitor sections 55 are formed between the internal electrodes 52a and 52b disposed so as to face each other via the dielectric 51 comprising the chip 53 and connected to the different external terminals 54a and 54b as shown in FIG. 4.

However, the conventional laminated capacitors shown in FIGS. 3 and 4 have had problems in that because a thickness of the dielectric interposed between the internal electrodes (hereinafter referred to as "element thickness") must be increased considerably to design a high-voltage withstanding capacitor, not only the value of breakdown voltage per unit thickness of the element thickness becomes low but also the electrostatic capacity which can be obtained becomes small as the element thickness increases. Accordingly, the performance of these capacitors is not adequate.

In order to solve these problems, a laminated capacitor as shown in FIG. 5 has been proposed (Unexamined Published Japanese Patent Application No. 8-037126).

This laminated capacitor has a quadruple series structure formed by alternately disposing first internal electrode groups 2 each comprising a first connected internal electrode 2a connected with one external terminal 4a, a second connected internal electrode 2b connected with another external terminal 4b and a floating internal electrode 2c positioned between the first and second connected internal electrodes 2a and 2b in the same plane and second internal electrode groups 12 each comprising a plurality (two here) of floating internal electrodes 12a disposed in a plane facing the first internal electrode group 2 via a dielectric (layer) 1 and containing no internal electrode connected to the external terminals 4a or 4b.

Because this laminated capacitor has the multiple series structure as described above and a value of breakdown voltage per element thickness (unit thickness) increases, it becomes possible to use a dielectric having thin element thickness and to increase the number of laminations because a dielectric whose element thickness is thin can be used. Accordingly, it is possible to obtain a small laminated capacitor having a large capacitance and excellent performance with respect to dielectric strength.

However, the laminated capacitor described above has had a problem in that when a distance D between edges X of the external terminals 4a and 4b and an edge a of the floating internal electrode 2c closest to the external terminals 4a and 4b among the floating internal electrodes 2c in the outermost layer is reduced below a certain degree, flashover occurs between the edges X—X of the external terminals 4a and 4b and the value of AC breakdown voltage drops.

Further, this capacitor has had a problem in that when the distance D between X-a is increased, the number of internal electrodes to be laminated must be increased to obtain a desired capacitance because an overlapped area of the internal electrodes decreases for the size of the dielectric. There has also been a problem that the AC breakdown voltage drops when the number of internal electrodes to be laminated increases.

The conventional laminated capacitor described above has had other problems because the dielectric strength performance drops when each gap G between the internal electrodes on the same plane is reduced below a certain degree and because the distance between X-a is reduced and flashover is liable to occur between the edges X—X when the gap G is increased because the floating internal electrode approaches the external terminal.

SUMMARY OF THE INVENTION

Accordingly, it is an object of the present invention to solve the aforementioned problems by providing a small laminated capacitor which prevents flashover and has excellent dielectric strength performance and a large capacitance.

The present inventors have conducted various experiments and studies on a structure of a laminated capacitor which is advantageous with respect to both breakdown voltage and electrostatic capacitance to be obtained and which prevents flashover to attain the above-mentioned object and have obtained the following findings.

In the case of the laminated capacitor having the quadruple series structure as shown in FIG. 5, when voltage E is applied between the external terminals 4a and 4b, the voltage applied to each capacitor section 5 has been determined to be E/4 and the voltage between the internal electrodes (between a–a' in FIG. 5) has been determined to be E/2. Accordingly, the voltage to be applied is equalized by setting the gap between the internal electrodes (the distance between a–a') G at two times the thickness of the dielectric (element thickness) t interposed between the internal electrodes. However, according to the experiments, it has been difficult to assure enough reliability as a product just by setting the gap G of the internal electrodes at two times the element thickness t because the value of breakdown voltage is dispersed in a breakdown voltage (BDV) test.

When the gap G between the internal electrodes is increased too much, on the other hand, the distance D between the edge X of the external terminals 4a and 4b and the edge a of the floating internal electrode 2c is reduced and flashover is liable to occur between the edges X—X of the external terminals 4a and 4b, as described above with reference to FIG. 5. Then, when the distance D between X-a is increased in order to avoid such a problem, the overlapped area of the internal electrodes becomes small for the size of the dielectric and the desired capacitance cannot be obtained. When the number of internal electrodes to be laminated is increased in order to compensate for this, the probability of causing pinholes increases, and the breakdown voltage drops.

The present inventors have conducted further experiments and studies based on such findings and have made the present invention.

According to the present invention, the laminated capacitor comprises a dielectric and internal electrodes connected to external terminals and internal electrodes not connected to the external terminals, the internal electrodes being disposed within the dielectric, the dielectric and the internal electrodes forming a laminated structure. The capacitor of the invention is formed more particularly by alternately disposing first internal electrode groups each comprising a first connected first internal electrode connected with one external terminal, a second connected first internal electrode connected with another external terminal and at least one first floating internal electrode positioned between the first and second connected first internal electrodes in the same plane. The invention further comprises second internal electrode groups each comprising a plurality of second floating internal electrodes disposed in one plane facing a respective first internal electrode group through the dielectric and containing no internal electrode connected to the external terminals, and by arranging the second floating internal electrodes being arranged adjacent the respective first internal electrode group at a spacing therefrom through the dielectric such that at least four serially connected capacitor sections are formed between the first and second connected internal electrodes connected to respective ones of the external terminals.

In this laminated capacitor, each gap between the internal electrodes in the same plane is set at 2.7 to 20 times the thickness (element thickness) of the dielectric layer positioned between the first and second internal electrode groups and the distance between an edge of the external terminal and an edge of the first floating internal electrode closest to the external terminal among the first floating internal electrodes comprising the first internal electrode group at outermost layer of the internal electrodes is set at 0.4 mm to 1.4 mm.

It then becomes possible to improve the dielectric strength performance by setting the gap between the internal electrodes in the same plane at 2.7 to 20 times the thickness of the dielectric layer (element thickness) positioned between the first and second internal electrode groups facing each other and to prevent flashover from occurring between the edge of the first external terminal and the edge of the floating internal electrode while avoiding the overlapped area of the internal electrodes from decreasing (that the overlapped area of the internal electrodes cannot be increased in proportion to the size of the dielectric) by setting the distance between the edge of the external terminal and the edge of the first floating internal electrode closest to the external terminal among the first floating internal electrodes comprising the first internal electrode group of the outermost layer at 0.4 mm to 1.4 mm.

It is noted that the gap between the internal electrodes is set at 2.7 to 20 times the element thickness because the value of breakdown voltage disperses when the gap between the internal electrodes is less than 2.7 times the element thickness. It then becomes difficult to maintain enough reliability as a product. Further, the overlapped area of the internal electrodes decreases for the size of the dielectric when the gap is increased more than 20 times, and this is not preferred.

The distance between the edge of the external terminal and the edge of the floating internal electrode closest to the external terminal among the floating internal electrodes comprising the first internal electrode group at the outermost layer is set within the range from 0.4 mm to 1.4 mm because the effect of suppressing the flashover becomes insufficient when the distance is less than 0.4 mm and because the overlapped area of the internal electrodes decreases considerably and it is not preferable when the distance exceeds 1.4 mm.

The above and other advantages of the invention will become more apparent in the following description and the accompanying drawings in which like numerals refer to like parts.

DESCRIPTION OF PREFERRED EMBODIMENTS

A preferred embodiment of the present invention will be described below to explain the inventive characteristics thereof in detail.

Figure 1:
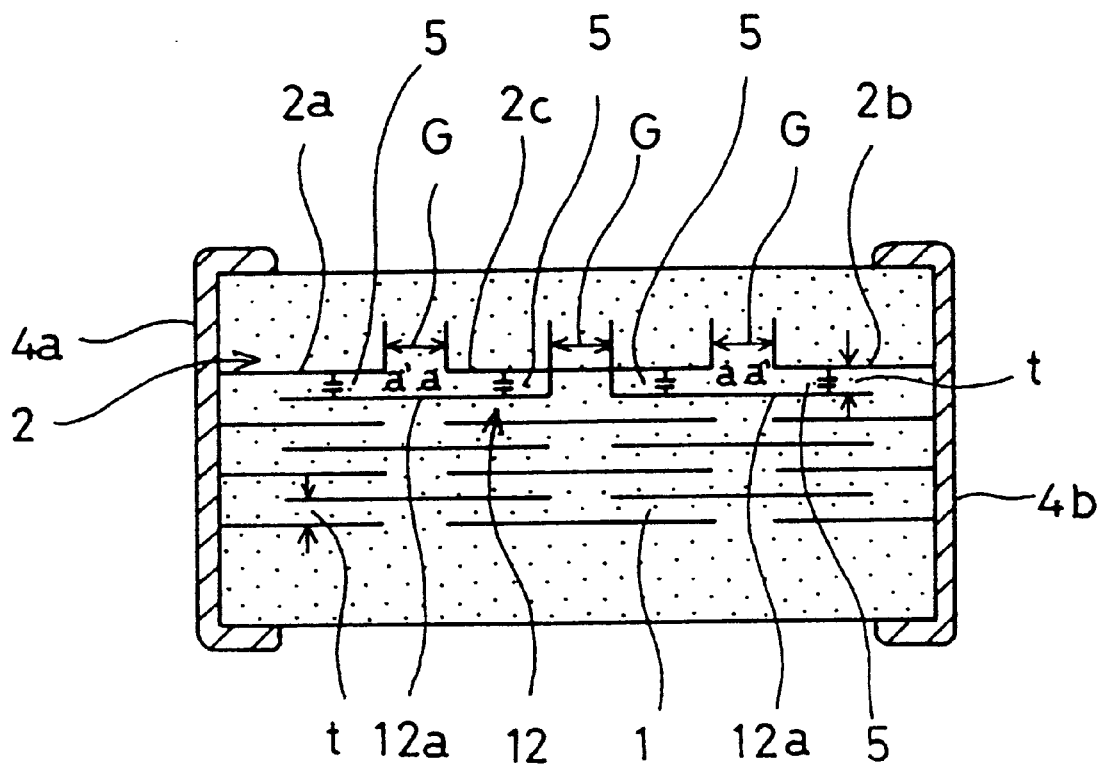
FIG. 1 is a sectional view of a laminated capacitor fabricated to show the relationship between each gap of internal electrodes in the same plane and the value of AC breakdown voltage.

A laminated capacitor as shown in FIG. 1 was fabricated at first in order to study the relationship between each gap between internal electrodes in the same plane and the value of AC breakdown voltage. This laminated capacitor has a quadruple series structure (four capacitors in each serial grouping) and is formed by alternately disposing first internal electrode groups 2 each comprising a first connected internal electrode 2a connected with one external terminal 4a, a second connected internal electrode 2b connected with another external terminal 4b and a floating internal electrode 2c positioned between the first and second connected internal electrodes 2a and 2b in the same plane and second internal electrode groups 12 each comprising a plurality (two here) of floating internal electrodes 12a disposed in a plane facing the first internal electrode group 2 via a dielectric (layer) 1 such as a ceramic and containing no internal electrode connected to the external terminals 4a or 4b.

As shown in FIG. 1, the first internal electrode group 2 and the second internal electrode group 12 are arranged such that each floating internal electrode (2c and 12a) comprising the respective groups faces respective parts of two electrodes facing via the dielectric 1. For instance, for the first internal electrode group 2 at the top layer and the second internal electrode group 12 in FIG. 1, four (quadruple) serially connected capacitor sections 5 are formed between the first and second connected internal electrodes 2a and 2b connected to the different external terminals 4a and 4b.

The present inventors then studied the value of AC breakdown voltage and the location where breakdown occurs (occurrence rate) in this laminated capacitor by changing the distance G between internal electrodes in the same plane (between a–a' in FIG. 1) as shown in Table 1. Table 1 shows the results.

TABLE 1

| Sample No. | Gap G between Internal Electrodes (μm) | Value of AC Breakdown Voltage | | Breakdown Occurs | |
|---|---|---|---|---|---|
| | | Average Value | Dispersion | Between Elements (%) | Between Internal Electrodes (between a–a') |
| 1 | 40 to 60 1.3 to 1.9 times element thickness | 1.90 | 0.34 | 10 | 90 |
| 2 | 60 to 80 2.0 to 2.6 times element thickness | 2.40 | 0.30 | 60 | 40 |
| 3 | 80 to 100 2.7 to 3.3 times element thickness | 2.50 | 0.10 | 100 | 0 |
| 4 | 100 to 120 3.4 to 4.0 times element thickness | 2.50 | 0.12 | 100 | 0 |

As shown in Table 1, in the laminated capacitor in Sample No. 1 in which the gap G of the internal electrode was set at 1.3 to 1.9 times the thickness (element thickness) t of the dielectric interposed between the internal electrodes in FIG. 1, the value of AC breakdown voltage was as low as 1.90 KVrms and 90% of the breakdowns occurred at the gap between the internal electrodes (between a–a' in FIG. 1). In the laminated capacitor of Sample No. 2 in which the gap G between the internal electrodes was set at 2.0 to 2.6 times the element thickness t, while the value of AC breakdown voltage has increased to 2.40 KVrms, 40% of the breakdown occurred at the gap part between the internal electrodes and the occurrence of breakdown became unstable.

In the laminated capacitor of Sample No. 3 in which the gap G between the internal electrodes was set at 2.7 to 3.3 times the element thickness t, the AC breakdown voltage was as high as 2.50 KVrms, the dispersion was small and no breakdown was seen at the gap part between the internal electrodes.

In the laminated capacitor of Sample No. 4 in which the gap G between the internal electrodes was set at 3.4 to 4.0 times element thickness t, the AC breakdown voltage was as high as 2.50 KVrms and the dispersion was small. However, there was a disadvantage in that the overlapped area of the internal electrode decreased when the gap G between the internal electrodes was increased too much.

Figure 2A:
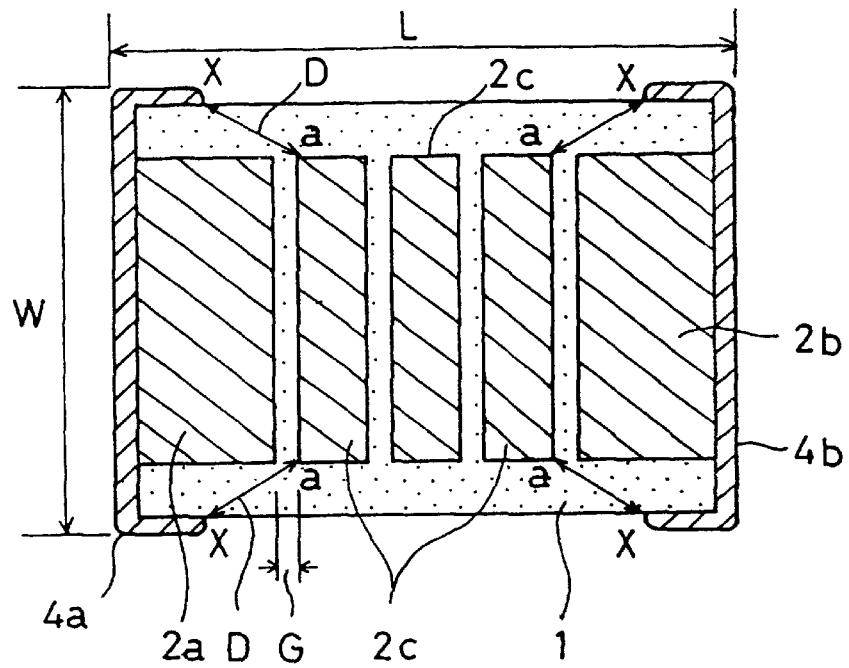
FIG. 2a is a plan sectional view showing a laminated capacitor according to one embodiment of the present invention and FIG. 2b is a front sectional view thereof.
Figure 2B:
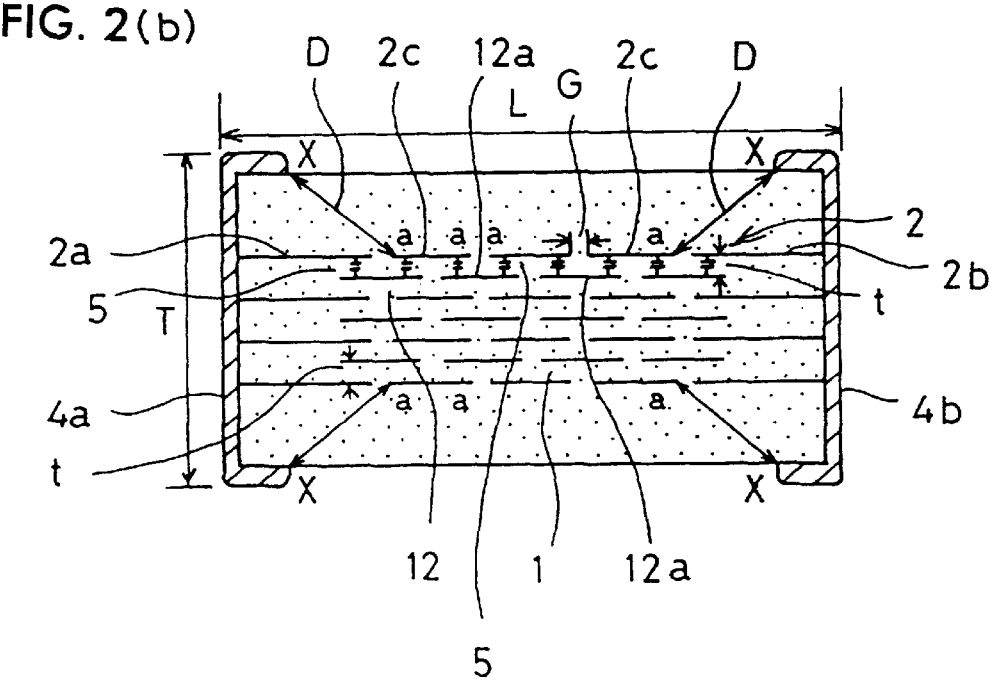
Figure 3:
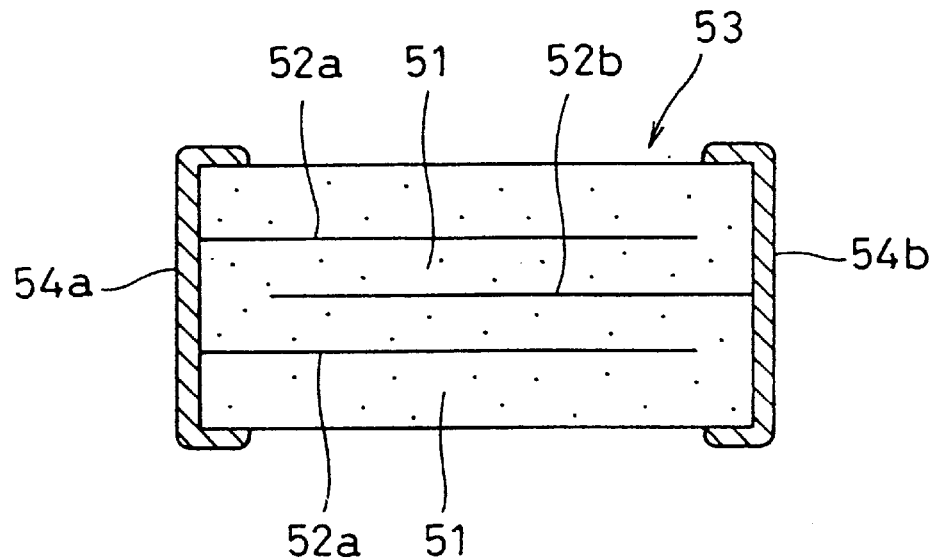
FIG. 3 is a sectional view showing a conventional laminated capacitor.
Figure 4:
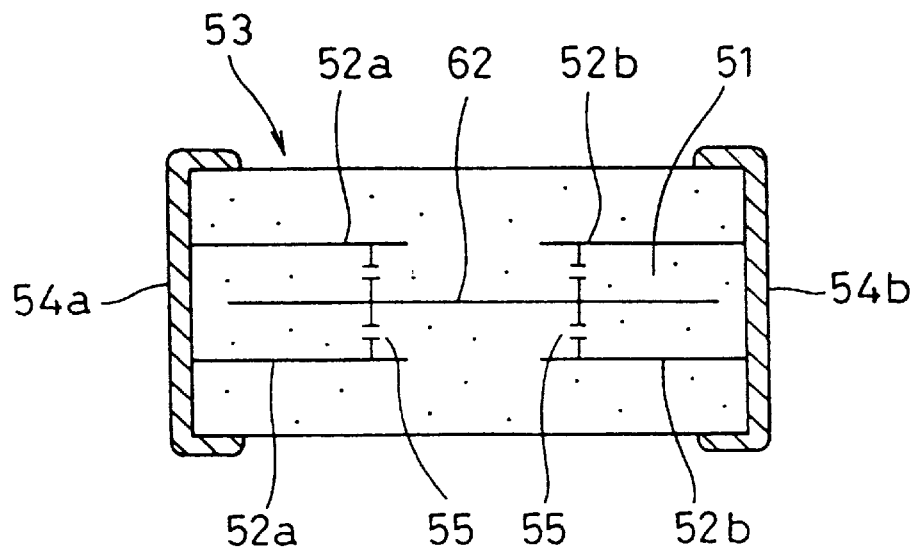
FIG. 4 is a sectional view showing another conventional laminated capacitor.
Figure 5:
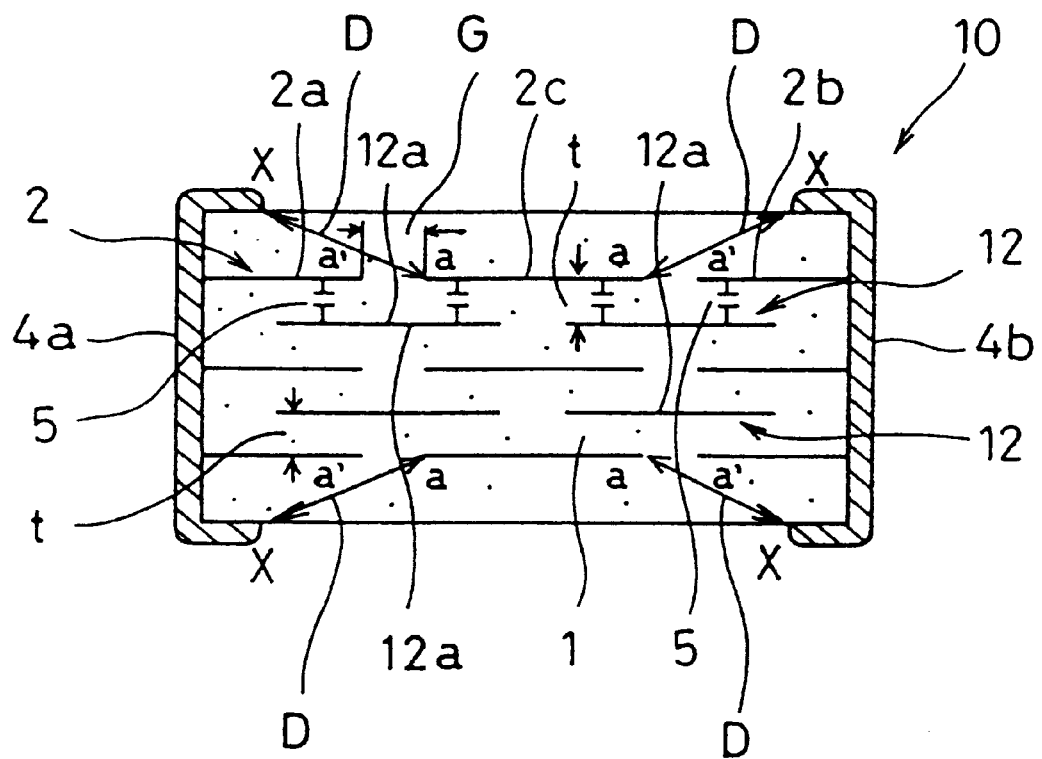
FIG. 5 is a sectional view showing still another conventional laminated capacitor.

FIGS. 2a and 2b are sectional views showing the laminated capacitor of one embodiment of the present invention.

This laminated capacitor has an octuple series structure (eight capacitors in each grouping) and is formed by alternately disposing first internal electrode groups 2 each comprising a first connected internal electrode 2a connected with one external terminal 4a, a second connected internal electrode 2b connected with another external terminal 4b and three floating internal electrodes 2c positioned between the first and second connected internal electrodes 2a and 2b in the same plane and second internal electrode groups 12 each comprising a plurality (four here) of floating internal electrodes 12a disposed in a plane facing the first internal electrode group 2 via a dielectric (layer) 1 and containing no internal electrode connected to the external terminals 4a or 4b.

The first internal electrode group 2 and the second internal electrode group 12 are arranged such that each floating internal electrode (2c and 12a) comprising the respective groups faces respective parts of two electrodes facing via the dielectric 1. For instance, for the first internal electrode group 2 on the top layer and the second internal electrode group 12 in FIG. 2, eight (octuple) serially connected capacitor sections 5 are formed between the first and second connected internal electrodes 2a and 2b connected to the different external terminals 4a and 4b. It is noted that the laminated capacitor of the present embodiment has a dimension of 5.7 mm in length L, 5.0 mm in width W and 2.0 mm in thickness T.

The present inventors then studied the value of AC breakdown voltage and the flashover occurrence rate in this laminated capacitor by changing the distance D between an edge X of the external terminals 4a and 4b and an edge a of the floating internal electrode 2c closest to the external terminals 4a and 4b at the outermost layer (first internal electrode group) 2 within a range from 0.2 to 1.6 mm and by changing the number of internal electrodes to be laminated within a range from 5 to 53. Table 2 shows the results.

TABLE 2

| Sample No. | Distance between Edge X of External Terminal and Edge a of Internal Electrode D (mm) | Number of Internal Electrodes Laminated | Value of AC Breakdown Voltage (KVrms) | | | Flashover Occurrence Rate (%) |
|---|---|---|---|---|---|---|
| | | | Av. | Max. | Min. | |
| 1 | 0.2 | 5 | 3.5 | 3.8 | 2.5 | 100 |
| 2 | 0.3 | 5 | 3.8 | 4.9 | 2.5 | 70 |
| 3 | 0.4 | 5 | 4.8 | 5.2 | 4.5 | 0 |
| 4 | 0.5 | 7 | 4.8 | 5.2 | 4.4 | 0 |
| 5 | 0.6 | 7 | 4.7 | 5.3 | 4.3 | 0 |
| 6 | 1.2 | 13 | 4.8 | 5.2 | 4.5 | 0 |
| 7 | 1.3 | 15 | 4.6 | 5.1 | 4.4 | 0 |
| 8 | 1.4 | 19 | 4.7 | 5.3 | 4.4 | 0 |
| 9 | 1.5 | 27 | 4.4 | 4.9 | 3.8 | 0 |
| 10 | 1.6 | 53 | 4.0 | 4.5 | 3.4 | 0 |

As shown in Table 2, in the laminated capacitors of sample Nos. 1 and 2 in which the distance D between X-a a was set at 0.2 mm and 0.3 mm, respectively, not only the value of AC breakdown voltage was as low as 3.5 KVrms (sample No. 1) and 3.8 KVrms (Sample No. 2), respectively, but also the flashover occurrence rate was as high as 100% sample No. 1) and 70% (Sample No. 2), respectively.

In the laminated capacitors of Sample Nos. 9 and 10 in which the distance D between X-a was set at 1.5 mm and 1.6 mm, respectively, the value of AC breakdown voltage was as low as 4.4 KVrms (Sample No. 9) and 4.0 KVrms (Sample No. 10), respectively, though no flashover was seen to occur.

In the laminated capacitors of Sample Nos. 3 through 8 in which the distance D between X-a was set at 0.4 mm to 1.4 mm, favorably the value of AC breakdown voltage was 4.6 to 4.8 KVrms, and no flashover was seen to occur.

It has been confirmed from the above-mentioned embodiments that it is possible to improve the dielectric strength performance by setting the gap G between the internal electrodes in the same plane at 2.7 to 20 times the element thickness t and to prevent efficiently flashover from occurring between the edge of the external terminal and the edge of the floating internal electrode while avoiding the overlapped area of the internal electrodes from decreasing by setting the distance D between the edge X of the external terminal and the edge a of the floating internal electrode at 0.4 mm to 1.4 mm.

It is noted that although the above-mentioned embodiment has been explained by exemplifying a laminated capacitor having an octuple series structure, the present invention can be widely applied to laminated capacitors having more than four serially connected capacitor sections.

Further, the inventive laminated capacitor has no specific restriction on the number of internal electrodes to be laminated, the element thickness and the like.

The present invention is not limited to the above-mentioned embodiments also in other respects. It can be applied in various ways and modified within the scope of the gist of the invention concerning the kind of the material comprising the dielectric, the concrete shape of the internal electrode and the external terminal and the like.

As described above, in the inventive laminated capacitor, it is possible to reliably prevent flashover from occurring between the edges of the external terminals while avoiding the overlapped area of the internal electrodes from decreasing (that the overlapped area of the internal electrode cannot be increased in proportion to the size of the dielectric) by setting the gap between the internal electrodes on the same plane at 2.7 to 20 times the thickness of the dielectric layer (element thickness) positioned between the first and second internal electrode groups which face each other and by setting the distance between the edge of the external terminal and the edge of the floating internal electrode at 0.4 mm to 1.4 mm.

Accordingly, the present invention can provide a small laminated capacitor which can prevent flashover and which has excellent dielectric strength performance and a large capacitance.

While the invention has been described in detail and with reference to specific embodiments thereof, it will be apparent to one skilled in the art that various changes and modifications can be made therein without departing from the spirit and scope thereof.

What is claimed is:

1. A laminated capacitor comprising a dielectric and internal electrodes connected to external terminals and internal electrodes not connected to the external terminals, the internal electrodes being disposed within said dielectric, said dielectric and said internal electrodes forming a laminated structure;

said laminated capacitor being formed by alternatingly disposed first internal electrode groups each comprising a first connected first internal electrode connected with one external terminal, a second connected first internal electrode connected with another external terminal and at least one first floating internal electrode positioned between said first and second connected first internal electrodes in the same plane and second internal electrode groups each comprising a plurality of second floating internal electrodes disposed in one plane facing a respective first internal electrode group through said dielectric and containing no internal electrode connected to said external terminals, being arranged said second floating internal electrodes adjacent said respective first internal electrode group at a spacing therefrom through the dielectric such that at least four serially connected capacitor sections are formed between said first and second connected first internal electrodes connected to respective ones of said external terminals;

each gap between said internal electrodes in the same plane being set at 2.7 to 20 times a thickness of said dielectric disposed between said first and second internal electrode groups facing each other; and a distance between an edge of one of said external terminals and an edge of said first floating internal electrode closest to said one of said external terminals of said first internal electrode group of an outermost layer of the internal electrodes being set at 0.4 mm to 1.4 mm; and a dimension of the first and the second internal electrodes in a longitudinal direction being larger than a dimension of the floating electrodes in the longitudinal direction.

2. The laminated capacitor of claim 1, wherein the at least one first floating internal electrode comprises a plurality of first floating internal electrodes disposed in the same plane as the first and second connected first internal electrodes.

3. The laminated capacitor of claim 1, wherein the plurality of second floating internal electrodes comprises four floating internal electrodes.

4. The laminated capacitor of claim 1, wherein the plurality of second floating internal electrodes are each disposed so that they are opposite a gap between the internal electrodes of a first internal electrode group wherein each of said second floating electrodes overlaps two adjacent first internal electrodes.

5. The laminated capacitor of claim 1 wherein there are provided a plurality of said first internal electrode groups and said second internal electrode groups, said first internal electrode groups and said second internal electrodes groups being disposed alternatingly in a stacked structure.

6. The laminated capacitor of claim 3 wherein the at least one first floating electrode comprises three first floating electrodes and eight serially connected capacitor sections are formed by said first internal electrode group and said second internal electrode group.

* * * * *